United States Patent
Yao et al.

(10) Patent No.: US 9,430,975 B2
(45) Date of Patent: Aug. 30, 2016

(54) ARRAY SUBSTRATE AND THE LIQUID CRYSTAL PANEL

(71) Applicant: Shenzhen China Star Optoelectronics Technology Co., Ltd., Shenzhen, Guangdong (CN)

(72) Inventors: Xiaohui Yao, Shenzhen (CN); Cheng-hung Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 475 days.

(21) Appl. No.: 14/232,271

(22) PCT Filed: Jul. 25, 2013

(86) PCT No.: PCT/CN2013/080076
§ 371 (c)(1),
(2) Date: Jan. 12, 2014

(87) PCT Pub. No.: WO2015/006996
PCT Pub. Date: Jan. 22, 2015

(65) Prior Publication Data
US 2016/0210924 A1    Jul. 21, 2016

(30) Foreign Application Priority Data

Jul. 19, 2013 (CN) .......................... 2013 1 0306890

(51) Int. Cl.
*G09G 3/36* (2006.01)
*G02F 1/1362* (2006.01)
*G02F 1/1368* (2006.01)

(52) U.S. Cl.
CPC ........... *G09G 3/3607* (2013.01); *G02F 1/1368* (2013.01); *G02F 1/13624* (2013.01); *G02F 1/136286* (2013.01); *G09G 3/3648* (2013.01); *G09G 3/3659* (2013.01); *G09G 3/3696* (2013.01); *G09G 2300/0443* (2013.01); *G09G2300/0447* (2013.01); *G09G 2300/0814* (2013.01); *G09G 2300/0819* (2013.01); *G09G 2320/028* (2013.01); *G09G 2320/0233* (2013.01); *G09G 2320/0242* (2013.01)

(58) Field of Classification Search
CPC ...... G09G 3/36; G09G 3/3607; G09G 3/364; G09G 3/3648; G09G 2300/0443; G09G 2300/0447; G09G 2300/0809; G09G 2300/0819; G09G 2320/0233; G09G 2320/028

See application file for complete search history.

(56) References Cited

U.S. PATENT DOCUMENTS

| | | | | |
|---|---|---|---|---|
| 7,773,169 B2* | 8/2010 | Song | ................ | G02F 1/133707 349/106 |
| 2006/0250533 A1* | 11/2006 | Shih | .................. | G02F 1/136213 349/38 |
| 2008/0211983 A1* | 9/2008 | Tsao | .................... | G02F 1/13624 349/48 |

(Continued)

FOREIGN PATENT DOCUMENTS

CN    102081269 A    6/2011

*Primary Examiner* — David Tung
(74) *Attorney, Agent, or Firm* — Andrew C. Cheng

(57) ABSTRACT

An array substrate and a liquid crystal panel are disclosed. Each of the pixel cells of the array substrate includes at least two pixel electrodes and at least two switch circuits. The first pixel electrode connects to the corresponding scanning line and corresponding data line of the pixel cell via the first switch circuit. The second pixel electrode connects to the corresponding scanning line of the pixel cell via the second switch circuit. The second pixel electrode connects to the first switch circuit at least via the second switch circuit such that the second pixel electrode is connected to the corresponding data line of the pixel cell. In this way, the color distortion in wide viewing angle and the display performance are enhanced.

13 Claims, 4 Drawing Sheets

(56) References Cited

U.S. PATENT DOCUMENTS

2008/0284929 A1\* 11/2008 Kimura ............... G02F 1/13624
  349/38
2009/0027320 A1\* 1/2009 Lai ....................... G09G 3/3659
  345/87
2011/0128210 A1\* 6/2011 Jung .................... G09G 3/3659
  345/32

\* cited by examiner

ARRAY SUBSTRATE AND THE LIQUID CRYSTAL PANEL

BACKGROUND OF THE INVENTION

1. Field of the Invention

The present disclosure relates to display technology, and more particularly to an array substrate and a liquid crystal panel.

2. Discussion of the Related Art

Vertical Alignment (VA) LCDs are characterized by attributes including quick response time and high contrast, and thus have become a current trend of LCD.

However, the alignments of liquid crystal are different and thus the reflective rates of the liquid crystal are not the same, which results in intensity change of the incident light beams. In other words, the transmission capability is decreased when the angle of the squint is large. The color observed at the right viewing angle is different from that observed at the squinted viewing angle such that the color distortion occurs in wide viewing angle.

SUMMARY

The object of the invention is to provide an array substrate and a liquid crystal panel to reduce the color difference in wide viewing angle so as to enhance the display performance.

In one aspect, an array substrate includes: a plurality of scanning lines, a plurality of data lines, a plurality of pixel cells, and a common electrode for inputting a common voltage, and each of the pixel cells corresponds to one scanning line and one data line; each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell via the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell, the control end of the controlled transistor connects to the corresponding scanning line of the pixel cell, the first end of the controlled transistor connects to the second pixel electrode, and the second end of the controlled transistor connects to the common electrode; and wherein when the corresponding scanning line of the pixel cell inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell via the first switch circuit and the second switch circuit in turn, the voltage difference between the first pixel electrode and the second pixel electrode is not equal to zero during operations of the first switch circuit and the second switch circuit, and a current amount of the first switch circuit is different from that of the second switch circuit when the switch circuits are turn on so as to obtain different voltage difference between the first pixel electrode and the second pixel electrode, the controlled transistor is a discharging thin film transistor (TFT), a control end of the controlled transistor corresponds to a gate of the discharging TFT, a first end of the controlled transistor corresponds to a source of the discharging TFT, and a second end of the controlled transistor corresponds to a drain of the discharging TFT, the discharging TFT changes the voltage of the second pixel electrode when the discharging TFT is turn on, a width/length ratio of the discharging TFT is smaller than a predetermined value such that the voltage difference between the second pixel electrode and the common electrode is decreased and is not equal to zero when the discharging TFT is turn on.

Wherein the first switch circuit is a first TFT, the second switch circuit is a second TFT, the width/length ratio of the first TFT is different from that of the second TFT such that the current amount of the first TFT is different from that of the second TFT when the TFTs are turn on.

Wherein each of the pixel cells further includes a third pixel electrode and a third switch circuit, the third pixel electrode connects to the corresponding scanning line of the pixel cell via the third switch circuit, and the third pixel electrode connects to the first switch circuit via the third switch circuit such that the third pixel electrode connects to the corresponding data line of the pixel cell.

In another aspect, an array substrate includes: a plurality of scanning lines, a plurality of data lines, a plurality of pixel cells, and a common electrode for inputting a common voltage, and each of the pixel cells corresponds to one scanning line and one data line; each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell via the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell, the control end of the controlled transistor connects to the corresponding scanning line of the pixel cell, the first end of the controlled transistor connects to the second pixel electrode, and the second end of the controlled transistor connects to the common electrode; and wherein when the corresponding scanning line of the pixel cell inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell via the first switch circuit and the second switch circuit in turn, the voltage difference between the first pixel electrode and the second pixel electrode is not equal to zero during operations of the first switch circuit and the second switch circuit, and the controlled transistor changes the voltage of the second pixel electrode when the controlled transistor is turn on such that the voltage difference between the second pixel electrode and the common electrode is decreased and is not equal to zero.

Wherein the current amount of the first switch circuit is different from that of the second switch circuit when the switch circuits are turn on so as to obtain different voltage difference between the first pixel electrode and the second pixel electrode.

Wherein the first switch circuit is a first TFT, the second switch circuit is a second TFT, the width/length ratio of the first TFT is different from that of the second TFT such that the current amount of the first TFT is different from that of the second TFT when the TFTs are turn on.

Wherein each of the pixel cells further includes a third pixel electrode and a third switch circuit, the third pixel electrode connects to the corresponding scanning hue of the pixel cell via the third switch circuit, and the third pixel electrode connects to the first switch circuit via the third switch circuit such that the third pixel electrode connects to the corresponding data line of the pixel cell; and the second pixel electrode connects to the first switch circuit via the second switch circuit and the third switch circuit in turn such that the second pixel electrode connects to the corresponding data line of the pixel cell.

Wherein the controlled transistor is a discharging TFT, a control end of the controlled transistor corresponds to a gate of the discharging TFT, a first end of the controlled transistor corresponds to a source of the discharging TFT, and a second end of the controlled transistor corresponds to a drain of the discharging TFT, and a width/length ratio of the discharging TFT is smaller than a predetermined value such that the voltage difference between the second pixel electrode and the common electrode is decreased and is not equal to zero when the discharging TFT is turn on.

In another aspect, a display panel includes: an array substrate, a color filtering substrate and a liquid crystal layer between the array substrate and the color filtering substrate; and the array substrate includes: a plurality of scanning lines, a plurality of data lines, a plurality of pixel cells, and a common electrode for inputting a common voltage, and each of the pixel cells corresponds to one scanning line and one data line; each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell is the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell, the control end of the controlled transistor connects to the corresponding scanning line of the pixel cell, the first end of the controlled transistor connects to the second pixel electrode, and the second end of the controlled transistor connects to the common electrode; and wherein when the corresponding scanning line of the pixel cell inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell via the first switch circuit and the second switch circuit in turn, the voltage difference between the first pixel electrode and the second pixel electrode is not equal to zero during operations of the first switch circuit and the second switch circuit, and the controlled transistor changes the voltage of the second pixel electrode when the controlled transistor is turn on such that the voltage difference between the second pixel electrode and the common electrode is decreased and is not equal to zero.

Wherein the current amount of the first switch circuit is different from that of the second switch circuit when the switch circuits arc turn on so as to obtain different voltage difference between the first pixel electrode and the second pixel electrode.

Wherein the first switch circuit is a first TFT, the second switch circuit is a second TFT, the width/length ratio of the first TFT is different from that of the second TFT such that the current amount of the first TFT is different from that of the second TFT when the TFTs are turn on.

Wherein each of the pixel cells further includes a third pixel electrode and a third switch circuit, the third pixel electrode connects to the corresponding scanning line of the pixel cell via the third switch circuit, and the third pixel electrode connects to the first switch circuit via the third switch circuit such that the third pixel electrode connects to the corresponding data line of the pixel cell; and the second pixel electrode connects to the first switch circuit via the second switch circuit and the third switch circuit in turn such that the second pixel electrode connects to the corresponding data line of the pixel cell.

Wherein the controlled transistor is a discharging TFT, a control end of the controlled transistor corresponds to a gate of the discharging TFT, a first end of the controlled transistor corresponds to a source of the discharging TFT, and a second end of the controlled transistor corresponds to a drain of the discharging TFT, and a width/length ratio of the discharging TFT is smaller than a predetermined value such that the voltage difference between the second pixel electrode and the common electrode is decreased and is not equal to zero when the discharging TFT is turn on.

In view of the above, each of the pixel cells of the array substrate includes at least two pixel electrodes and at least two switch circuits. The first pixel electrode connects to the corresponding scanning line and corresponding data line of the pixel cell via the first switch circuit. The second pixel electrode connects to the corresponding scanning line of the pixel cell via the second switch circuit. The second pixel electrode connects to the first switch circuit at least via the second switch circuit such that the second pixel electrode is connected to the corresponding data line of the pixel cell. The voltage difference between the first pixel electrode and the second pixel electrode is not equal to zero during operations of the first switch circuit and the second switch circuit. In this way, the color distortion in wide viewing angle and the display performance are enhanced.

BRIEF DESCRIPTION OF THE DRAWINGS

FIG. 3 is an equivalent-circuit diagram of the pixel cell of FIG. 2 when the switch circuit and the controlled transistor are turn on.

FIG. 6 is an equivalent-circuit diagram of the pixel cell of FIG. 5 when the switch circuit and the controlled transistor are turn on.

DETAILED DESCRIPTION OF THE EMBODIMENTS

Embodiments of the invention will now be described more fully hereinafter with reference to the accompanying drawings, in which embodiments of the invention are shown.

In order to reduce the color distortion in wide viewing angle, one pixel is divided into a plurality of pixel areas. By applying different voltage to the pixel areas, the alignment of the liquid crystal in two areas are different, which reduces the color distortion in wide viewing angle. Thus, the low color shirt (LCS) effect is achieved.

Figure 1:
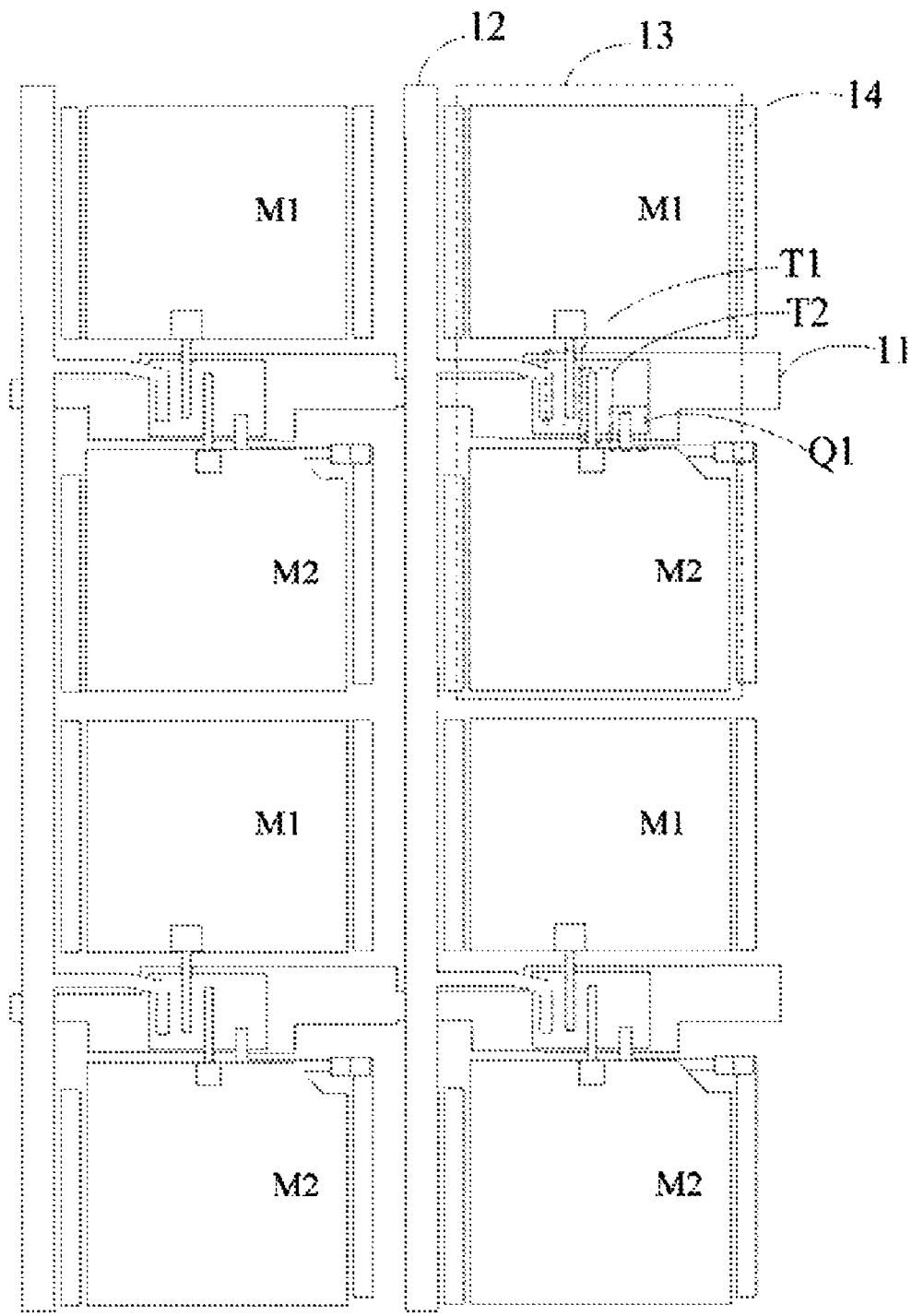
FIG. 1 is a schematic view of the array substrate in accordance with one embodiment.
Figure 2:
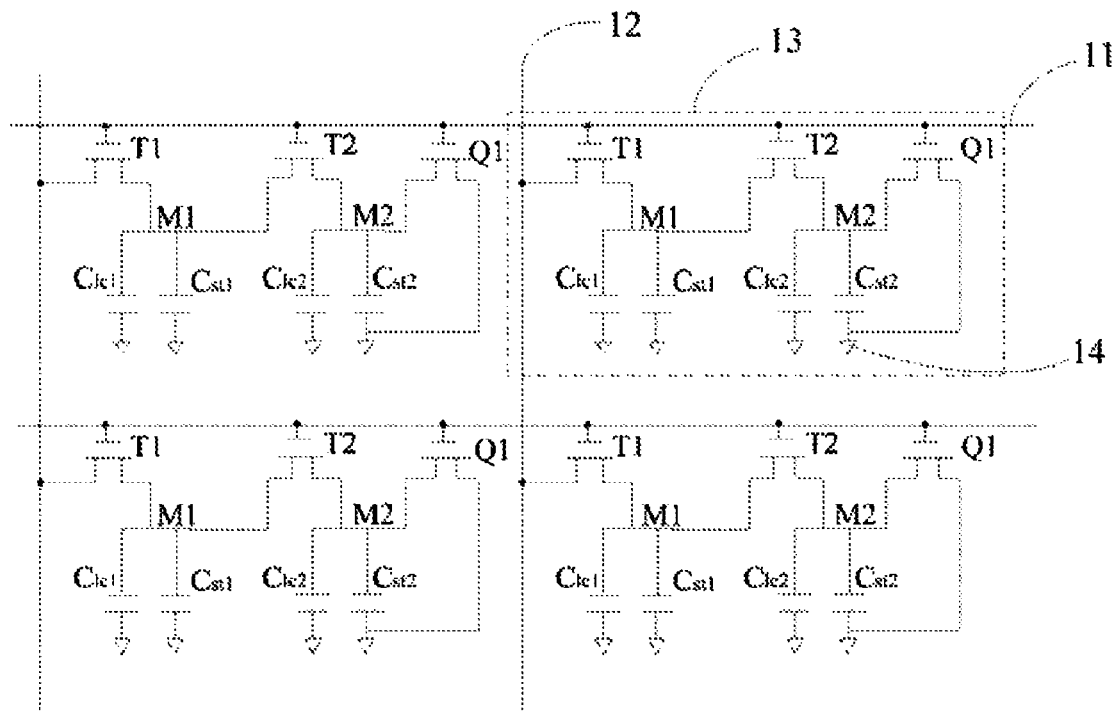
FIG. 2 is an equivalent-circuit diagram of the pixel cell of FIG. 1.

Referring to FIGS. 1 and 2, the array substrate includes a plurality of scanning lines 11, a plurality of data lines 12, a plurality of pixel cells 13, and a common electrode 14 for inputting a common voltage.

Each of the pixel cells 13 includes two pixel electrode and two switch circuits. The two pixel electrode are the first pixel electrode M1 and the second pixel electrode M2. The two switch circuits are implemented by thin film transistors (TFTs) including a first TFT T1 operating on the first pixel electrode M1 and a second TFT T2 operating on the second pixel electrode M2. Each of the first TFT T1 and the second TFT T2 include a control end, an input end, and an output end. The gate of the first TFT T1 and the second TFT T2 electrically connect to the corresponding scanning line 11 of the pixel cell 13. The source of the first TFT T1 electrically connects to the corresponding data line 12 of the pixel cell 13. The drain of the first TFT T1 electrically connects to the first pixel electrode M1. The source of the second TFT T2 electrically connects to the drain of the first TFT T1. The drain of the second TFT T2 electrically connects to the second pixel electrode M2 such that the second pixel electrode M2 connects to the first TFT T1 via the second TFT T2. Thus, the second pixel electrode M2 connects to the corresponding data line 12 of the pixel cell 13.

The pixel cell 13 further includes a controlled transistor Q1. The controlled transistor Q1 includes a control end, a first end, and a second end. The control end of the controlled transistor Q1 electrically connects to the corresponding scanning line 11 of the pixel cell 13. The first end of the controlled transistor Q1 electrically connects to the second pixel electrode M2. The second end of the controlled transistor Q1 electrically connects to the common electrode 14. The controlled transistor Q1 is a discharging TFT. The control end of the controlled transistor Q1 corresponds to the gate of the discharging TFT. The first end of the controlled transistor Q1 corresponds to the source of the discharging TFT. The second end of the controlled transistor Q1 corresponds to the drain of the discharging TFT.

In other embodiments, the first switch circuit, the second switch circuit, the controlled transistor may be, but not limited to triode or Darlington transistor.

Figure 3:
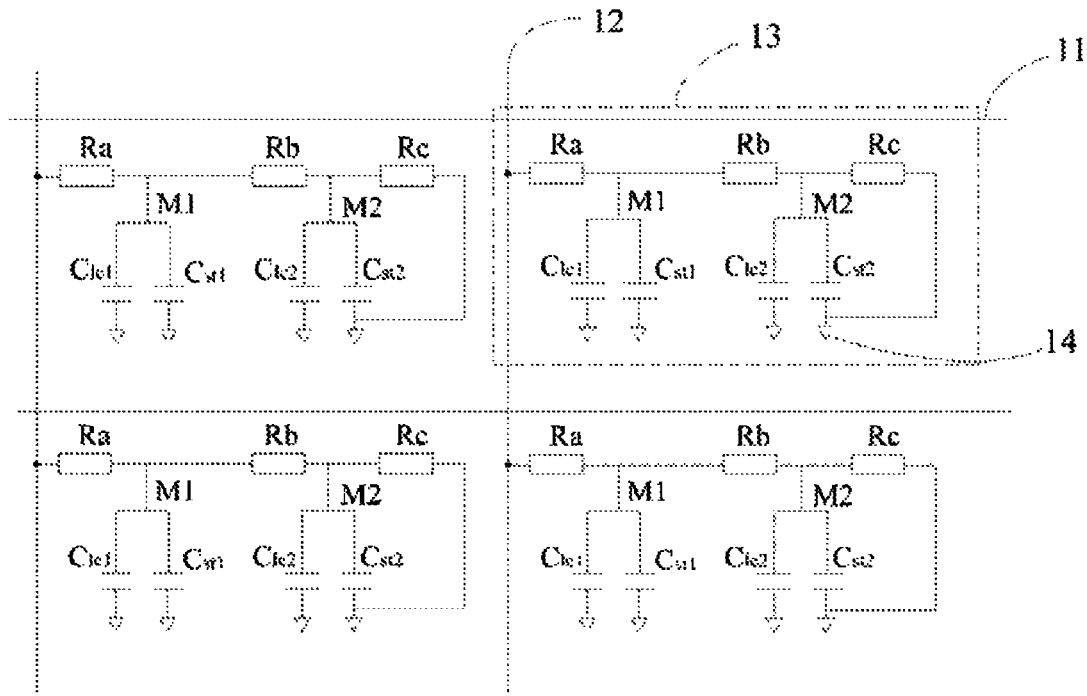

When the pixel cell 13 is driven, the common electrode 14 inputs the common voltage. The scanning line 11 inputs scanning signals to turn on the first TFT T1, the second TFT T2 and the controlled transistor Q1. The data line 12 inputs data signals. The data signals are input to the first pixel electrode M1 via the first TFT T1, and then input to the second pixel electrode M2 via the first TFT T1 and the second TFT T2 in turn. As such, the first pixel electrode M1 receives the data signals from the data line 12 via the first TFT T1, and the second pixel electrode M2 receives the data signals from the data line 12 via the first TFT T1 and the second TFT T2 in turn. The voltage of the first pixel electrode M1 is different from that of the second pixel electrode M2 due to the operations of the first TFT T1 and the second TFT T2. Referring to FIG. 3, when the TFT is turn on, the TFT is equivalent to a resistor having a certain resistance. The value of the resistance is positively dependent from a width/length ratio of the TFT. When the width/length ratio is greater, the value of the equivalent resistance is smaller when the TFT is turn on, and vice versa. The first TFT T1 is equivalent to the resistor Ra when being turned on. The second TFT T2 is equivalent to the resistor Rb when being turn on. The controlled transistor Q1 is equivalent to the resistor Rc when being turn on. When the scanning line 11 inputs the scanning signals, the resistor Ra, the resistor Rb, and the resistor Rc are serially connected. The data signals from the data line 12 are input to the first pixel electrode M1 via the resistor Ra, and are input to the second pixel electrode M2 via the resistor Ra and the resistor Rb in turn. The voltage Vs represents the voltage input from the data line 12. Basing on the voltage-division principle, the voltage of the first pixel electrode M1 is calculated by the equation of:

$$V1 = Vs*(Rb+Rc)/(Ra+Rb+Rc) \tag{1}$$

The voltage of the second pixel electrode M2 is calculated by the equation of:

$$V2 = Vs*Rc/(Ra+Rb+Rc) \tag{2}$$

It can be understood that the voltage of the second pixel electrode M2 is smaller than the voltage of the first pixel electrode M1 such that the voltage difference between the first pixel electrode M1 and the second pixel electrode M2 equals to a certain value. The voltage difference is not equal to zero and thus the color distortion in wide viewing angle can be enhanced.

In the embodiment, the first TFT T1 is similar to the second TFT T2, that is, the width/length ratio of the first TFT T1 and the second TFT T2 are the same. As such, the resistance of the resistor Ra and the resistor Rb is equivalent when the first TFT T1 and the second TFT T2 are turn on. In this way, the current amount of the first TFT T1 and the second TFT T2 when being turn on are also the same. Basing on the voltage-division principle, the voltage of the first pixel electrode M1 can be different from that of the second pixel electrode M2 under the circumstance that the values of the equivalent resistors are the same. Thus, the color distortion in side viewing angle is enhanced.

In addition, the voltage of the second pixel electrode M2 is changed when the controlled transistor Q1 is turn on such that the voltage difference between the second pixel electrode M2 and the common electrode 14 is decreased and is not equal to zero. Specifically, when the positive polarity is inverse (the data signals is larger than the common voltage), the scanning line 11 inputs the scanning signals to turn on the controlled transistor Q1. A portion of the charges of the second pixel electrode M2 is transferred to the common electrode 14 such that the voltage of the second pixel electrode M2 is decreased. Thus, the voltage of the second pixel electrode M2 is different from that of the first pixel electrode M1. In addition, the voltage difference between the second pixel electrode M2 and the common electrode 14 is decreased so as to reduce the color distortion in wide viewing angle. When the negative polarity is inverse (the data signals is smaller than the common voltage), the second pixel electrode M2 is charged by the common electrode 14 so as to increase the voltage of the second pixel electrode M2. The increased amount of the voltage of the second pixel electrode M2 is not equal to the voltage difference between the second pixel electrode M2 and the first pixel electrode M1 due to the operations of the controlled transistor Q1. As such, the voltage difference between the first pixel electrode M1 and the second pixel electrode M2 equals to a certain value. In addition, when the voltage of the second pixel electrode M2 is increased, the voltage difference between the second pixel electrode M2 and the common electrode 14 is decreased, which further reduces the color distortion in wide viewing angle. Furthermore, the voltage difference between the second pixel electrode M2 and the common electrode 14 is not equal to zero when the controlled transistor Q1 is turn on so as to ensure that the second pixel electrode M2 can be in a normally displaying state. Thus, regardless of the positive polarity or the negative polarity is inverse, the voltage of the second pixel electrode M2 is changed when the controlled transistor Q1 is turn on such that the voltage difference between the second pixel electrode M2 and the common electrode 14 is decreased and is not equal to zero. In the embodiment, the controlled transistor Q1 is the TFT and the width/length ratio of the controlled transistor Q1 is smaller than a predetermined value, which results in a smaller current amount when the controlled transistor Q1 is turn on. Further, the charge transferring speed between the second pixel electrode M2 and the common electrode 14 is slower so as to keep the second pixel electrode M2 and the common electrode 14 from transiting to a charges balance state when the controlled transistor Q1 is turn on. The voltage difference between the second pixel electrode M2 and the common electrode 14 equals to the certain value. BY controlling the charge transferring speed between the second pixel electrode M2 and the common electrode 14, the voltage of the first pixel electrode M1 is different from that of the second pixel electrode M2 when the negative polarity is inverse.

In other embodiments, the width/length ratio of the first TFT T1 and the second TFT T2 are different such that the current amount of the first TFT T1 and the second TFT T2 are different. As such, the voltage difference between the first pixel electrode and the second pixel electrode are different. For example, when the width/length ratio of the first TFT T1 is larger than that of the second TFT T2, the voltage difference between the first pixel electrode and the second pixel electrode is enlarged, which provides a better display performance. In another example, the width/length ratio of the first TFT T1 is smaller than that of the second TFT T2.

By configuring the width/length ratio of the first TFT T1 and the second TFT T2, the values of the equivalent resistance are changed when the first TFT T1 and the second TFT T2 are turn on. Thus, the voltage difference between the first pixel electrode and the second pixel electrode is obtained to achieve different LCS effects.

In other embodiments, the voltage difference between the first pixel electrode and the second pixel electrode is changed without configuring the width/length ratio of the TFTs. The first switch circuit is implemented by only the first TFT and the second switch circuit is implemented by the second TFT and a divider resistor such that the current amount of the first switch circuit and the second circuit are not the same when being turn on. As such, different voltage difference between the first pixel electrode and the second pixel electrode can be obtained. Specifically, the first pixel electrode connects to the corresponding data line of the pixel cell via the first TFT. The second pixel electrode connects to the first TFT via the second TFT and the divider resistor in turn such that the second pixel electrode connects to the corresponding data line of the pixel cell. The width/length ratio of the first TFT and the second TFT are the same. By configuring the resistance of the divider resistor, the current amount of the second switch circuit is adjusted such that the current amount of the first switch circuit and the second switch circuit are different when the first switch circuit and the second switch circuit are turn on. In this way, the voltage difference between the first pixel electrode and the second pixel electrode are different so as to achieve different LCS effect. In other embodiments, different voltage are applied to the first pixel electrode and the second pixel electrode. The first switch circuit include one or a plurality of divider resistors. The second switch circuit may include a plurality of divider resistors such that the voltage of the first pixel electrode is different from that of the second pixel electrode.

Figure 4:
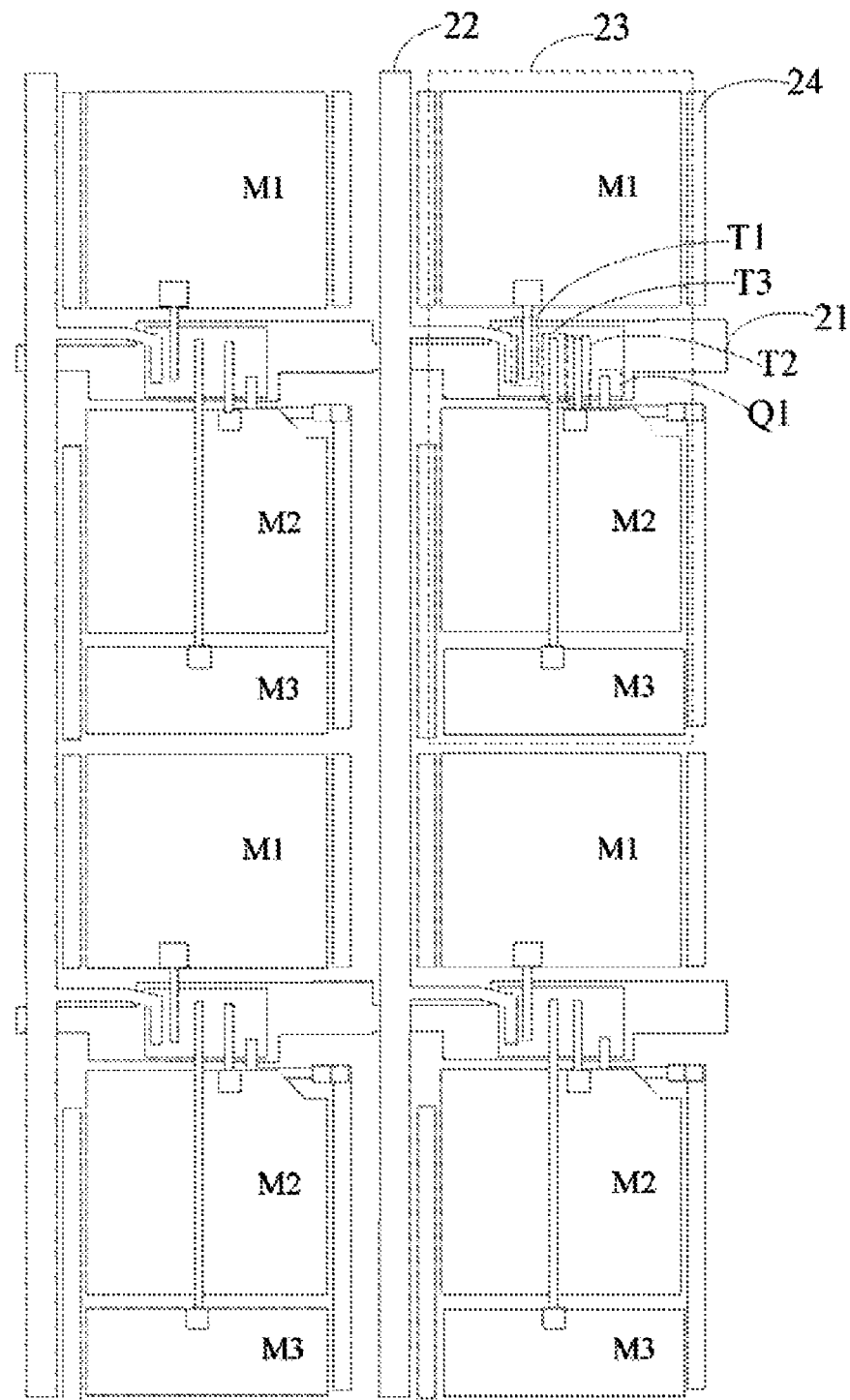
FIG. 4 is a schematic view of the array substrate in accordance with another embodiment.
Figure 5:
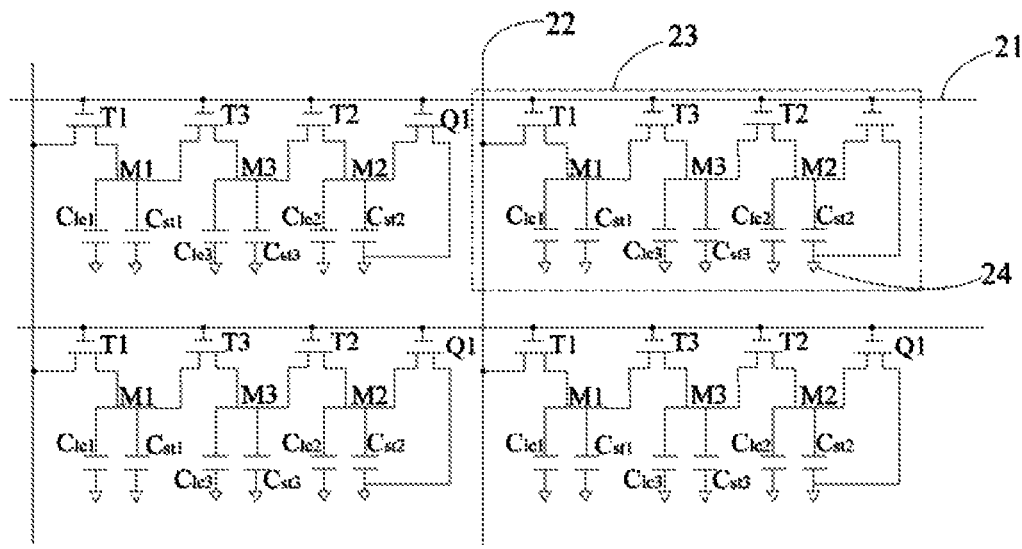
FIG. 5 is an equivalent-circuit diagram of the pixel cell in accordance with another embodiment.

FIGS. 4 and 5 show the array substrate in accordance with another embodiment. The pixel cell 23 further includes a third pixel electrode M3 and a third switch circuit. The third switch circuit is a third TFT T3. The third pixel electrode M3 connects to the corresponding scanning line 21 of the pixel cell 23 via the third TFT T3. The third pixel electrode M3 connects to the first TFT T1 via the third TFT T3 such that the third pixel electrode M3 connects to the corresponding data line 22 of the pixel cell. The second pixel electrode M2 connects to the first TFT T1 via the first TFT T1 and the second TFT T2 in turn such that the second pixel electrode M2 connects to the corresponding data line 22 of the pixel cell 23. Specifically, the gate of the first TFT T1, the second TFT T2, and the third TFT T3 connect to the corresponding scanning line 21 of the pixel cell 23. The source of the first TFT T1 connects to the corresponding data line 22 of the pixel cell 23. The drain of the first TFT T1 connects to the first pixel electrode M1. The source of the third TFT T3 connects to the drain of the first TFT T1. The drain of the third TFT T3 connects to the third pixel electrode M3. The source of the second TFT T2 connects to the drain of the third TFT T3. The drain of the second TFT T2 connects to second pixel electrode M2.

Figure 6:
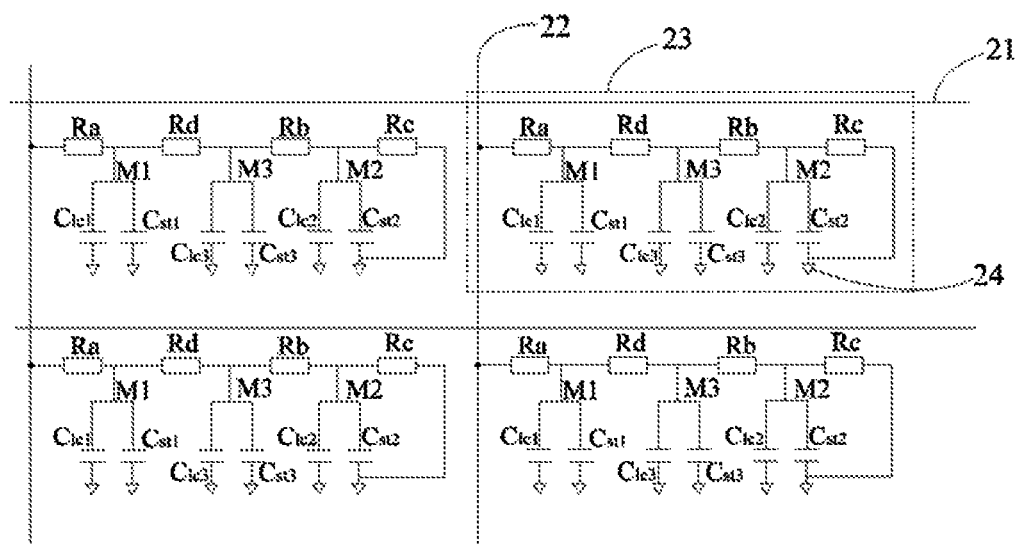

When the scanning line 21 inputs the scanning signals to turn on the first TFT T1, the second TFT T2, the third TFT T3 and the controlled transistor Q1, the data line 22 inputs the data signals. The first pixel electrode M1 receives the data signals via the first TFT T1. The third pixel electrode M3 receives the data signals via the first TFT T1 and the third TFT T3 in turn. The second pixel electrode M2 receives the data signals via the first TFT T1, the second TFT T2, and the third TFT T3 in turn. Referring to FIG. 6, the first TFT T1, the second TFT T2, the third TFT T3, and the controlled transistor Q1 are respectively equivalent to the resistor Ra, Rb, Rd, and Rc. The voltage Vs represents the voltage input from the data line 23. The voltage of the first pixel electrode M1 is calculated by the equation of:

$$V1=Vs*(Rd+Rb+Rc)/(Ra+Rb+Rd+Rc) \quad (3)$$

The voltage of the third pixel electrode M3 is calculated by the equation of:

$$V3=Vs*(Rb+Rc)/(Ra+Rb+Rd+Rc) \quad (4)$$

The voltage of the second pixel electrode M2 is calculated by the equation of:

$$V2=Vs*Rc/(Ra+Rb+Rc) \quad (5)$$

It can be understood that the voltage of the third pixel electrode M3 is smaller than that of the first pixel electrode M1. The voltage of the second pixel electrode M2 is smaller than that of the third pixel electrode M3. As such, the voltage difference between the first pixel electrode M1, the second pixel electrode M2, and the third pixel electrode M3 equals to one certain value and thus the color distortion in wide viewing angle is enhanced. By configuring the width/length ratio of the first TFT T1, the second TFT T2 and the third TFT T3, the resistance is adjusted when the first TFT T1, the second TFT T2, and the third TFT T3 are turn on. In this way, the voltage of the first pixel electrode M1, the second pixel electrode M2, and the third pixel electrode M3 are adjusted so as to obtain different voltage difference and to achieve different LCS effect.

In other embodiments, each of the pixel cells includes four or five pixel electrodes, which can be implemented by the above method.

Figure 7:
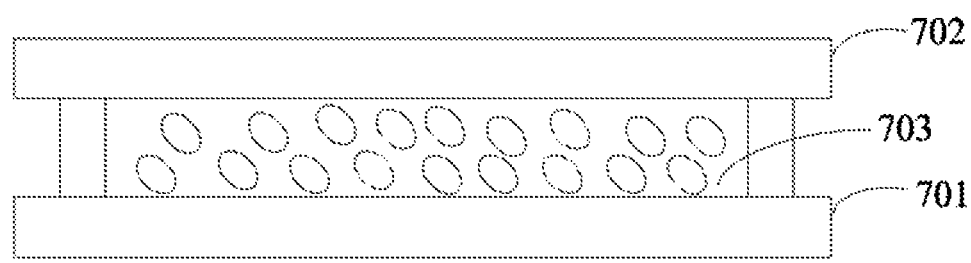
FIG. 7 is a schematic view of the liquid crystal panel in accordance with one embodiment.

FIG. 7 is a schematic view of the liquid crystal display in accordance with one embodiment. The liquid crystal panel includes the array substrate 701, a color filtering substrate 702, and a liquid crystal layer 703. The array substrate 701 may be the array substrate in the above embodiments.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising:
    a plurality of scanning lines, a plurality of data lines, a plurality of pixel cells, and a common electrode for inputting a common voltage, and inch of the pixel cells corresponds to one scanning line and one data line;
    each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell via the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell, the control end of the controlled transistor connects to the corresponding scanning line of the pixel cell, the first end of the controlled transistor connects to the second pixel electrode, and the second end of the controlled transistor connects to the common electrode; and
    wherein when the corresponding scanning line of the pixel cell inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell via the first switch circuit and the second switch circuit in turn, the voltage difference between the first pixel electrode and the second pixel electrode is not equal to zero during operations of the first switch circuit and the second switch circuit, and a current amount of the first switch circuit is different from that of the second switch circuit when the switch, circuits are turned on so as to obtain different voltage difference between the first pixel electrode and the second pixel electrode, the controlled transistor is a discharging thins film transistor (TFT), a control end of the controlled transistor corresponds to a gate of the discharging TFT, a first end of the controlled transistor corresponds to a source of the discharging TFT and a second end of the controlled transistor corresponds to a drain of the discharging TFT, the discharging TFT changes the voltage of the second pixel electrode when the discharging TFT is turned on, a width/length ratio of the discharging TFT is smaller than a predetermined value such that the voltage difference between the second pixel electrode and the common electrode is decreased and is not equal to zero when the discharging TFT is turned on.

2. The array substrate as claimed in claim 1, wherein the first switch circuit is a first TFT, the second switch circuit is a second TFT, the width/length ratio of the first TFT is different from that of the second TFT such that the current amount of the first TFT is different from that of the second TFT when the TFTs are turn on.

3. The array substrate as claimed in claim 1, wherein each of the pixel cells further includes a third pixel electrode and a third switch circuit, the third pixel electrode connects to the corresponding scanning line of the pixel cell via the third switch circuit, and the third pixel electrode connects to the first switch circuit via the third switch circuit such that the third pixel electrode connects to the corresponding data line of the pixel cell.

4. An array substrate, comprising:
    a plurality of scanning lines, a plurality of data lines, a plurality of pixel cells, and a common electrode for inputting a common voltage, and each of the pixel cells corresponds to one scanning line and one data line;
    each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell via the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell, the control end of the controlled transistor connects to the corresponding scanning line of the pixel cell, the first end of the controlled transistor connects to the second pixel electrode and the second end of the controlled transistor connects to the common electrode, and
    wherein when the corresponding scanning line of the pixel cell inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell via the first switch circuit and the second switch circuit in turn, the voltage difference between the first pixel electrode and the second pixel electrode is not equal to zero during operations of the first switch circuit and the second switch circuit, and the controlled transistor changes the voltage of the second pixel electrode when the controlled transistor is turned on such that the voltage difference between the second pixel electrode and the common electrode is decreased and is not equal to zero.

5. The array substrate as claimed in claim 4, wherein the current amount of the first switch circuit is different from that of the second switch circuit when the switch circuits are turn on so as to obtain different voltage difference between the first pixel electrode and the second pixel electrode.

6. The array substrate as claimed in claim 5, wherein the first switch circuit is a first TFT, the second switch circuit is a second TFT the width/length ratio of the first TFT is different from that of the second TFT such that the current amount of the first TFT is different from that of the second TFT when the TFTs are turn on.

7. The array substrate as claimed in claim 4, wherein each of the pixel cells further includes a third pixel electrode and a third switch circuit, the third pixel electrode connects to the corresponding scanning line of the pixel cell via the third switch circuit, and the third pixel electrode connects to the first switch circuit via the third switch circuit such that the third pixel electrode connects to the corresponding data line of the pixel cell; and the second pixel electrode connects to the first switch circuit via the second switch circuit and the third switch circuit in turn such that the second pixel electrode connects to the corresponding data line of the pixel cell.

8. The array substrate as claimed in claim 4, wherein the controlled transistor is a discharging TFT, a control end of the controlled transistor corresponds to a gate of the discharging TFT, a first end of the controlled transistor corresponds to a source of the discharging TFT, and a second end of the controlled transistor corresponds to a drain of the discharging TFT, and a width/length ratio of the discharging TFT is smaller than a predetermined value such that the voltage difference between the second pixel electrode and the common electrode is decreased and is not equal to zero when the discharging TFT is turn on.

9. A display panel, comprising:
an array substrate, a color filtering substrate and a liquid crystal layer between the array substrate and the color filtering substrate, and
the array substrate includes:
a plurality of scanning lines, a plurality of data lines, a plurality of pixel cells, and a common electrode for inputting a common voltage, and each of the pixel cells corresponds to one scanning line and one data line;
each of the pixel cells includes two pixel electrodes and two switch circuits, the two pixel electrode include a first pixel electrode and a second pixel electrode, the two switch circuits include a first switch circuit operating on the first pixel electrode and a second switch circuit operating on the second pixel electrode, each of the pixel cells further includes a controlled transistor having a control end, a first end, and a second end, the first pixel electrode connects to the corresponding scanning line and data line of the pixel cell via the first switch circuit, the second pixel electrode connects to the corresponding data line of the pixel cell via the second switch circuit, and the second pixel electrode connects to the first switch circuit at least via the second switch circuit such that the second pixel electrode connects to the corresponding data line of the pixel cell the control end of the controlled transistor connects to the corresponding scanning line of the pixel cell, the first end of the controlled transistor connects to the second pixel electrode, and the second end of the controlled transistor connects to the common electrode, and wherein when the corresponding scanning line of the pixel cell Inputs the scanning signals to turn on the first switch circuit, the second switch circuit and the controlled transistor, the first pixel electrode receives the data signals from the corresponding data lines of the pixel cell via the first switch circuit, the second pixel electrode receives the data signals from the corresponding data lines of the pixel cell pia the first switch circuit and the second switch circuit in turn, the voltage difference between the first pixel electrode and the second pixel electrode is not equal to zero during operations of the first switch circuit and the second switch circuit, and the controlled transistor changes the voltage of the second pixel electrode when the controlled transistor is turned on such that the voltage difference between the second pixel electrode and the common electrode is decreased and is not equal to zero.

10. The liquid crystal panel as claimed in claim 9, wherein the current amount of the first switch circuit is different from that of the second switch circuit when the switch circuits are turn on so as to obtain different voltage difference between the first pixel electrode and the second pixel electrode.

11. The liquid crystal panel as claimed in claim 10, wherein the first switch circuit is a first TFT, the second switch circuit is a second TFT, the width/length ratio of the first TFT is different from that of the second TFT such that the current amount of the first TFT is different from that of the second TFT when the TFTs are turn on.

12. The liquid crystal panel as claimed in claim 9, wherein each of the pixel cells further includes a third pixel electrode and a third switch circuit, the third pixel electrode connects to the corresponding scanning line of the pixel cell via the third switch circuit, and the third pixel electrode connects to the first switch circuit via the third switch circuit such that the third pixel electrode connects to the corresponding data line of the pixel cell; and the second pixel electrode connects to the first switch circuit via the second switch circuit and the third switch circuit in turn such that the second pixel electrode connects to the corresponding data line of the pixel cell.

13. The liquid crystal panel as claimed in claim 9, wherein the controlled transistor is a discharging TFT, a control end of the controlled transistor corresponds to a gate of the discharging TFT, a first end of the controlled transistor corresponds to a source of the discharging TFT, and a second end of the controlled transistor corresponds to a drain of the discharging TFT, and a width/length ratio of the discharging TFT is smaller than a predetermined value such that the voltage difference between the second pixel electrode and the common electrode is decreased and is not equal to zero when the discharging TFT is turn on.

* * * * *